March 10, 1964     T. W. WINSTEAD     3,124,282
TWO-PIECE CLOSURE FITTING FOR PLASTIC CONTAINERS
Filed Oct. 20, 1961     2 Sheets-Sheet 1
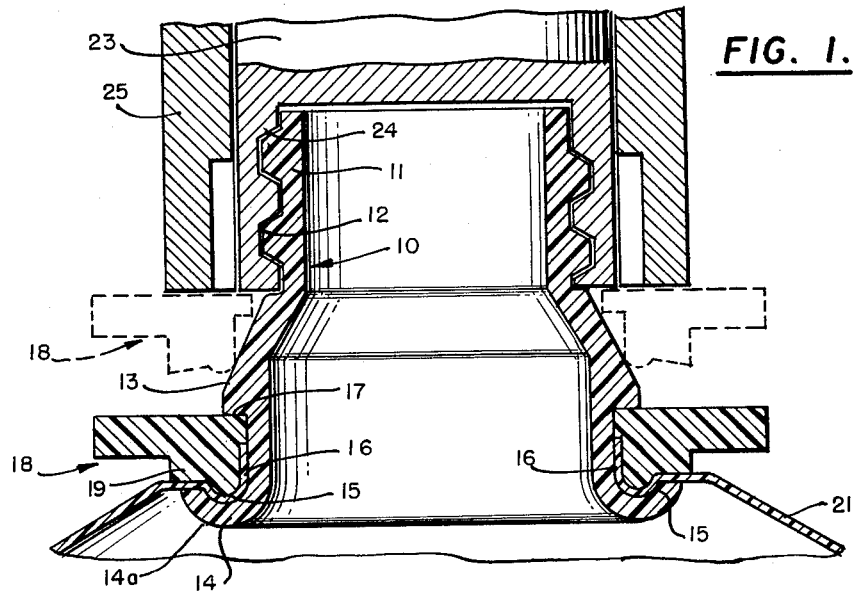
FIG. 1.
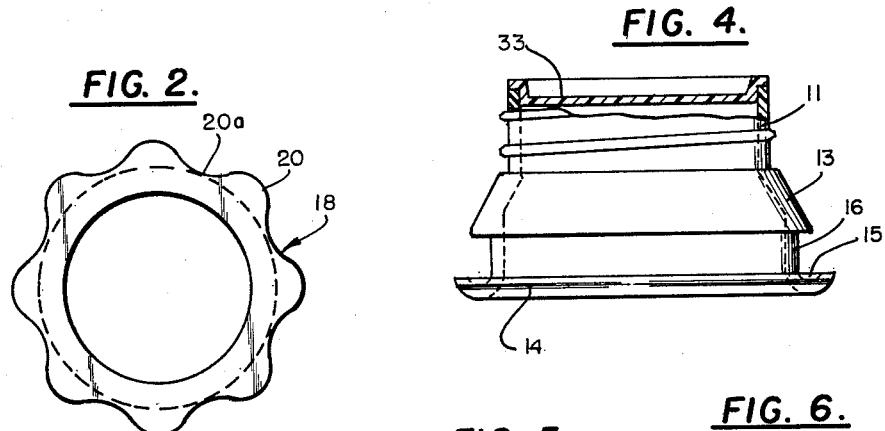
FIG. 2.
FIG. 4.
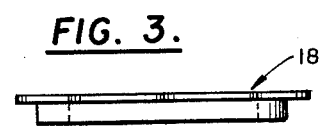
FIG. 3.
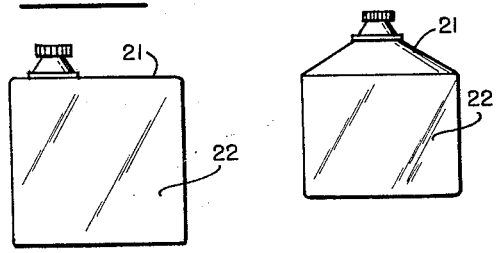
FIG. 5.
FIG. 6.
INVENTOR.
Thomas W. Winstead
BY Raphael Semmes
ATTORNEY

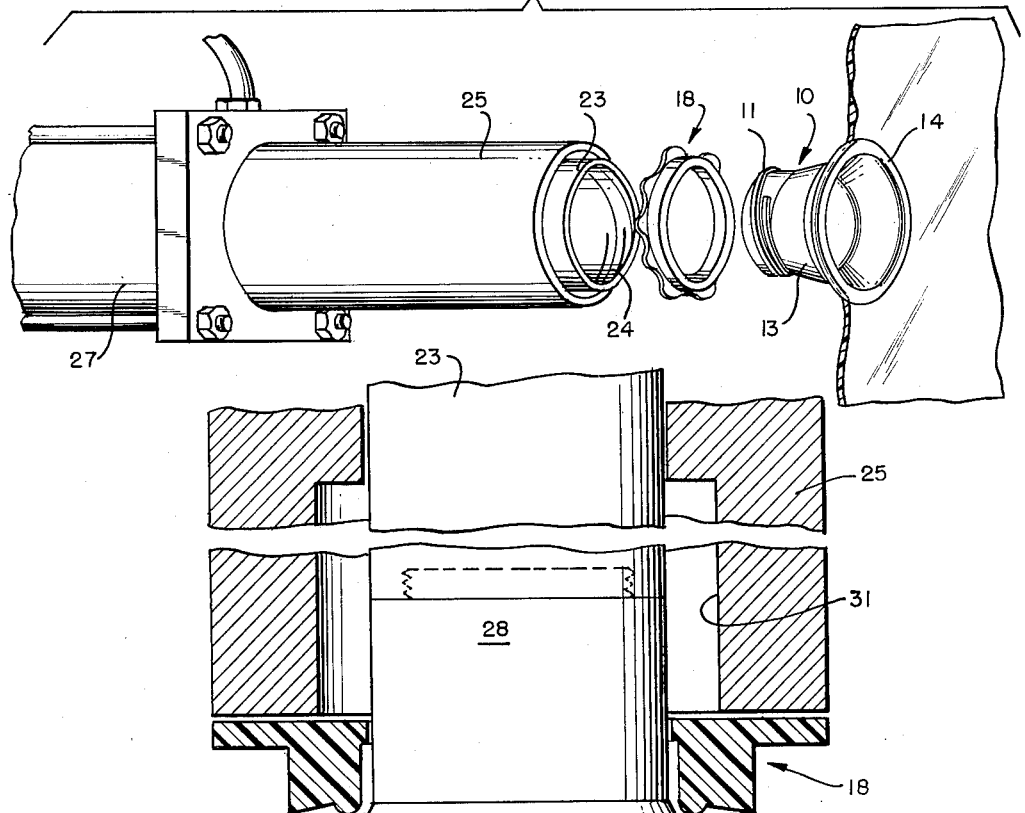
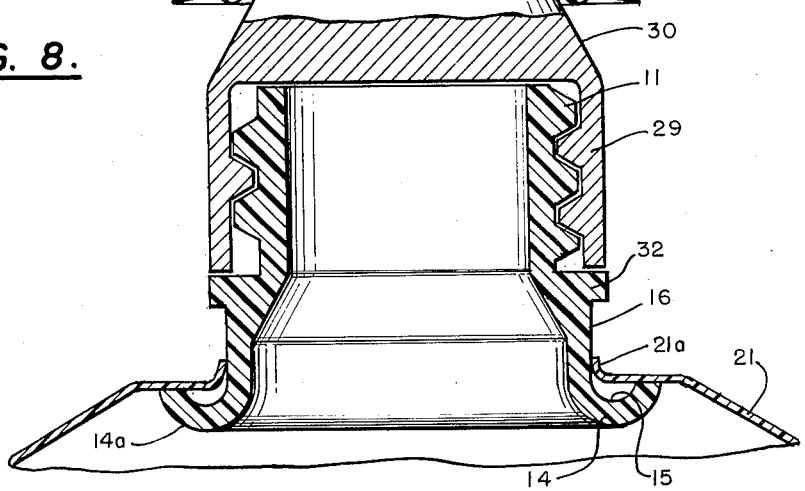

United States Patent Office 3,124,282
Patented Mar. 10, 1964

3,124,282
TWO-PIECE CLOSURE FITTING FOR
PLASTIC CONTAINERS
Thomas W. Winstead, Baltimore, Md., assignor to Hedwin
Corporation, New York, N.Y., a corporation of
Maryland
Filed Oct. 20, 1961, Ser. No. 146,492
5 Claims. (Cl. 222—569)

This invention relates to closures for plastic containers and consists more particularly in new and useful improvements in a two-piece plastic fitting to be used in conjunction with and as a closure for plastic containers, especially thin walled containers.

The primary object of the invention is to provide a fitting of the type designed to facilitate the pouring of liquids and/or powders from a plastic container and comprising a main body or spout member and a locking ring, whereby the fitting is securely fastened to the boundaries of an opening provided in the wall of a container with a leak-proof seal.

One of the most difficult problems in providing an effective closure for thin walled containers including molded and bag types, has been the difficulty of producing a sufficiently heavy closure without increasing the thickness of a disproportionately large area of the container wall with the resultant increase in cost. Efforts have been made to solve this problem by separately molding the fitting, and fastening it to the side wall of the container by various sealing means. For example, in the case of bag type containers for liquids, the separately molded closure fitting has been secured in place by a method of heat sealing, which not only requires more complicated apparatus and more careful quality control in its use, but also inherently produces a weaker connection due to the concentration of stresses in the container wall adjacent to the heat seal itself.

It is therefore another object of this invention to provide a method of fastening the molded closure fitting into the wall opening without resorting to heat sealing and in a manner which is far simpler and therefore less expensive.

A further object of the invention is to provide a closure fitting which embodies a mechanical, leak-proof joint between the fitting and the container wall which is devoid of heat stresses or other stress concentrations found in heat seals and is therefore less subject to failure in shipping or use.

Still another object of the invention is to provide in a plastic closure fitting, a novel locking ring arrangement which is adapted to be expanded during installation, either by the design of the fitting itself or by a separate tool, for subsequent contraction in a complementary locking groove, the boundaries of the opening in the container wall being firmly gripped and sealed between the locking ring and the complementary groove.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views:

FIGURE 1 is a vertical sectional view showing one form of two-piece fitting and assembly tool, wherein the fitting itself is designed to effect expansion of the ring;

FIGURE 2 is a top plan view of the locking ring;

FIGURE 3 is a view of the ring in side elevation;

FIGURE 4 is a view of the closure fitting shown in FIGURE 1, but including a sealed diaphragm;

FIGURE 5 is a side elevational view of one form of container wherein the fitting assembly is inserted in a flat wall thereof;

FIGURE 6 is a similar view of a modified type of container wherein the fitting assembly is installed in an opening in a funnel-shaped wall or portion thereof;

FIGURE 7 is an exploded perspective view of the two-piece fitting and assembly tool; and FIGURE 8 is a vertical sectional view of a modified fitting assembly and expander tool.

In the drawings, referring first to FIGURE 1, the numeral 10 generally represents the main fitting body which comprises a cylindrical neck portion 11, externally threaded as at 12 to accommodate the internal threads on a suitable closure cap of conventional design. In this particular form of the invention, at the lower end of the neck portion 11, the fitting body flares outwardly as at 13 forming a self-contained ring expander as will later appear. The fitting body terminates at its lower extremity in a radially enlarged flange or base 14 which is substantially arcuate in cross-section to form in its top face, a horizontal annular groove 15, the inner boundary of which merges with an inwardly offset recess 16 underlying a shoulder 17 formed by the lower extremity of the flaring ring expander portion 13. As will be seen, the lower surface 14a of the base is radiused for the purpose hereinafter described.

The locking ring 18 comprises a thickened annular gripping portion 19 which is shaped in cross-section so that its gripping surface substantially conforms to the cross-sectional shape of the combined groove and recess 15—16 in the lower end of the fitting body and the upturned bounding lip of the base. A radial flange 20 bounds the gripping portion 19 and the periphery of the flange may be either fluted as shown at 20a to facilitate attachment during the filling operation of a thin walled container, or the periphery may be plain.

The choice of materials from which the two fitting parts are made depends upon the ultimate container use. However, most thermoplastics will readily accommodate the small distortion required of the locking ring during the assembly operation, as will later appear. Reasonable stiffness is desired and therefore in the particular embodiments of the invention here disclosed, high density polyethylene is used for the fitting parts, whereas the container wall with which the fitting parts are to be used is usually of low density polyethylene.

In the use of this two-piece fitting, the grooved base 14 of the fitting body is forcibly inserted from the exterior, through an opening in the wall 21 of a plastic container 22, the opening being of sufficiently reduced diameter with respect to the base of the fitting body to cause the annular wall area of the container bounding the opening to contract (forming an upstanding collar which tightly hugs the recess 16 after passage of the base 14 therethrough. The ring 18 has an inside diameter designed to slip readily over the neck 11, but normally less than the outside diameter of the recessed portion 16. During installation, the ring 18 is expanded as will later appear, and after passing over the shoulder 17, contracts within the recess 16, gripping the collar formed by the bounding edges of the opening in wall 21 between the lower face of the ring and the groove 15 in base 14 as shown in full lines in FIGURE 1.

In this particular form of the invention, which is shown as applied to a container opening in a wall portion of frusto-conical shape, the assembly tool comprises a mandrel 23, internally threaded as at 24 at its lower end to engage the external threads on the neck 11 of the fitting body. Surrounding the mandrel 23 is a sleeve 25, the lower extremity of which is adapted to abut the upper surface of the locking ring 18 shown in dotted lines in FIGURE 1, which has been slipped over the mandrel 23 and rests on the converging upper surface of the expander portion 13 of the fitting. Thus, by retracting the mandrel within the sleeve 25, the plastic locking ring 18 is expanded over the flaring surface 13 until it reaches the edge of shoulder 17, whereupon it snaps into place in the combined groove and recess 15—16, clamping the bounding edges of the wall opening between the ring and the base 14.

Various means may be employed for causing the desired relative movement between the mandrel 23 and the sleeve 25. For example, in the exploded view in FIGURE 7, the sleeve 25 extends forwardly from a fixed hydraulic mechanism 27, the mandrel 23 being caused to reciprocate in the sleeve by a hydraulically actuated plunger (not shown). Thus, with the threaded neck 11 of the fitting 10 firmly engage with the threads 24 of the mandrel 23, and with the projecting end of the sleeve in abutment with the flange 20 of the locking ring 18, the application of hydraulic pressure in mechanism 27 retracts the mandrel within the sleeve, forcing the ring over the flaring portion 13 and past the shoulder 17, to snap the ring in place, firmly gripping the bounding edge of the wall opening between the ring and the base 14.

In the modified form of the invention shown in FIGURE 8, the expansion of the ring is accomplished entirely by the assembly tool and, in this particular adaptation, the omission of the flaring expander portion 13 previously described, permits a shorter, overall dimension of the fitting body 10. However, the assembly tool must be provided with a mandrel having a removable end portion to permit application of the locking ring.

As will be seen from FIGURE 8, the mandrel 23 of the assembly tool is provided with a removable end portion 28 which terminates at its lower extremity in an enlarged head 29 which is internally threaded to engage the threads in the neck portion 11 of the fitting body, in the same manner as the lower end of the mandrel 23 in FIGURE 1. The periphery of the head 29 where it joins the connecting end 28, is flared as at 30 to form a ring expander. In this embodiment, the sleeve 25 is provided with an annular recess 31 in the inner periphery of its lower end, said recess being of a length and diameter to accommodate the enlarged head 29 of the mandrel when the latter is retracted therein.

The fitting body, in this instance, is provided with a radial shoulder 32 which overhangs the annular recess 16 and has an outside diameter substantially the same as the outside diameter of the head 29.

In one manner of installing this form of the invention, the flange 14 is forcibly inserted in the reduced opening in the container wall 21 as previously described, and the end 28 of the mandrel is removed to permit the locking ring 18 to be slipped thereover. The end portion 28 is then connected to the main mandrel 23 and upon rotation of the mandrel, brings the upper face of the ring 18 into abutment with the adjacent end of the sleeve 25 so that the continued retraction of the mandrel causes the ring to expand overt the flaring portion 30, forcing it down over the head 29 and shoulder 32 of the fitting, when it snaps into the combined groove and recess 15—16 to clamp the bounding edges of the container wall between the flange and the ring.

It is to be noted that in both of these embodiments of the invention, the seal between the fitting and container wall is effected primarily by the pressures between the locking ring 18 and the recess 15 after the locking ring has snapped below the shoulder 17 or 32. In the drawings, it will be seen that the container wall is provided with a hole which is smaller in diameter than the fitting body so that when the wall portion is drawn over the base of fitting body 10, an upwardly turned cylindrical collar 21a is formed at the boundary of the container opening. This collar nestles neatly in the recess 16 wherein the locking ring ultimately is positioned. Although this upturned collar is not essential, it does further enhance the mechanical joint of the entire assembly. This collar is produced simply by having the hole in the container wall smaller than the fitting body in the area of the sealing groove. The same would be true if the container wall were perfectly flat as in FIGURE 5, with no truncated cone section for recessing the fitting. Even in a very thin walled bag type container, the results can be obtained by proper positioning of the hole diameters.

In a molded container, the collar 21a could actually be thermoformed in the side wall, if preferred, so that it would inherently conform to the fitting body without the diameters being of different size. This might be desirable where stresses of the particular plastic used might otherwise result in stress cracking. Although the locking ring 18 is somewhat smaller on its inside diameter than the diameter of the fitting body in the recessed area 16, this does not necessarily have to be the case, for it is important to remember that the pressure maintained between the two fitting parts against the container wall is achieved primarily by the vertical interference between the shoulder 17 or 32 which retains the locking ring, and the grooved base 15 of the fitting body, against which the locking ring is forced. This results in a vertical "press fit" which would by itself lock securely the container wall, even in the case where a large diameter of 6 to 8 inches were involved and circumferential or radial pressures thereby minimized.

In other words, either of these conditions above described will contribute to a good mechanical joint and seal. However, it is the vertical fit of the locking ring and the pressures therefrom which are considered more important than the radial or circumferential forces.

As previously stated, the flange 20 of the locking ring may be fluted or plain at its periphery. By employing the flutes 20a, it enables the location of devices on filling equipment to precisely position the fitting under a filling nozzle independently of the position of the container itself. Also, either the flutes or the solid ring in the same plane as the flutes could be extended to a larger diameter to provide a shoulder for locking the fitting to the flaps or wall of an outer carton in which the container is carried.

Obviously, if desired, the closure of the fitting body may be other than the screw cap variety; for example, it might comprise a snap cap closure, a pouring spout closure, or any number of a variety of closures or attachments considered applicable to thin walled containers. The neck portion 11 may also be provided with a molded diaphragm as shown at 33 in FIGURE 4. This diaphragm extends across the opening in the neck of the fitting and may subsequently be removed by the end user of the package. In effect, this provides a hermetically sealed package and the seal between the removable cap and the fitting lip would be of little importance during shipping. Such a fitting, of course, could only be put in the container after it had been filled. The filling would be accomplished through the hole provided in the container wall which is subsequently closed when the fitting body 10 is put in place and the locking ring snapped into position.

It will thus be seen that the present invention provides a molded two-piece fitting which affords a mechanical, pressure, friction lock with a thin walled container which otherwise lacks the rigidity or available material for a comparable closure. Although the friction fit may be designed with other forms in the locking area, a good attachment will depend upon either radial or vertical forces basically similar to the design shown which provides a snap action fit between the two parts, locking the container wall therebetween and exerting particularly a strong vertical component of locking force. The lower radius 14a of the fitting body base actually deflects during assembly which helps to contribute to the vertical locking force against the locking ring, once it has cleared the upper shoulder provided to secure it.

From the foregoing, it is believed that the invention may be readily understood by those skilled in the art without further description, it being borne in mind that numerous changes may be made in the details disclosed without departing from the spirit of the invention as set forth in the following claims.

I claim:

1. A closure fitting means for a restricted wall opening in a resilient plastic container, comprising an annular body portion having a neck at one end and terminating at its opposite end in an enlarged base, a radially extending flange on said base, adapted to be forcibly inserted through said restricted opening from the exterior, an annular sealing groove in the top face of said flange for receiving the material of said wall bounding said opening, an annular peripheral recess in said base, merging into said groove at its lower end, the diameter of the recessed portion of the periphery of said base being greater than that of said wall opening, to thereby stretch the material of the wall bounding said opening, forming an annular collar of said material which embraces said recessed portion, a radial shoulder overhanging the upper end of said recess, a resilient locking ring slidable over said neck and of an inside diameter normally less than the outside diameter of said annular recess, and means for temporarily expanding said ring to clear said shoulder, whereby upon contraction, said ring snaps into sealing engagement with said annular collar in said recess and the material of said wall lying in said annular groove.

2. A two-piece closure fitting for a restricted wall opening in a plastic container, comprising an annular body portion having a neck at one end and terminating at its opposite end in an enlarged base, a radially extending flange on said base, adapted to be forcibly inserted through said restricted opening from the exterior, an annular sealing groove in the top face of said flange for receiving the material of said wall bounding said opening, an annular peripheral recess in said base merging into said groove at its lower end, the diameter of the recessed portion of the periphery of said base being greater than that of said wall opening, to thereby stretch the material of the wall bounding said opening, forming an annular collar of said material which embraces said recessed portion, a radial shoulder overhanging the upper end of said recess, and a resilient locking ring slidable over said neck and forcibly engageable with said recess and groove in sealing engagement with said annular collar in said recess and the material of said wall lying in said groove, the engaging surface of said sealing ring conforming in cross-sectional contour with the adjacent recessed and grooved surfaces of said flange and base, respectively.

3. A closure fitting means for a restricted wall opening in a resilient plastic container, comprising an annular body portion having a neck at one end and terminating at its opposite end in an enlarged base, a radially extending flange on said base, adapted to be forcibly inserted through said restricted opening from the exterior, an annular peripheral recess in said base, the diameter of the recessed portion of the periphery of said base being greater than that of said wall opening, to thereby stretch the material of the wall bounding said opening, forming an annular collar of said material which embraces said recessed portion, a radial shoulder overhanging the upper end of said recess, a resilient locking ring slidable over said neck and of an inside diameter normally less than the outside diameter of said annular recess, and means for temporarily expanding said ring to clear said shoulder, whereby upon contraction said ring snaps into sealing engagement with said annular collar in said recess, and the material of said wall embracing said flange.

4. A closure fitting as claimed in claim 3, wherein said shoulder is provided between said neck and peripheral recess with a downwardly and outwardly sloping ring expanding section.

5. In combination, a closure fitting for a restricted wall opening in a resilient plastic container, comprising an annular body portion having a neck at one end and terminating at its opposite end in an enlarged base, a radially extending flange on said base, adapted to be forcefully inserted through said restricted opening from the exterior, an annular sealing groove in the top face of said flange for receiving the material of said wall bounding said opening, an annular, peripheral recess in said base, merging into said groove at its lower end, the diameter of the recessed portion of the periphery of said base being greater than that of said wall opening, to thereby stretch the material of the wall bounding said opening, and form an annular collar of said material which embraces said recessed portion, a radial shoulder overhanging the upper end of said recess, the upper surface of said shoulder between said neck and peripheral recess being downwardly and outwardly inclined to provide a ring expanding section, a resilient locking ring slidable over said neck and of an inside diameter normally less than the outside diameter of said annular recess, said neck adapted to be encircled by means coacting with said ring for forcing the latter longitudinally of said neck over the sloping surface of said shoulder for temporarily expanding said ring during said longitudinal movement to clear said shoulder, whereby, upon contraction, said ring snaps into sealing engagement with said annular collar in said recess and the material of said wall lying in said annular groove.

References Cited in the file of this patent

UNITED STATES PATENTS

| | | |
|---|---|---|
| 2,322,213 | Amberg | June 22, 1943 |
| 2,374,796 | Amberg | May 1, 1945 |